US012145826B2

(12) United States Patent
Li et al.

(10) Patent No.: US 12,145,826 B2
(45) Date of Patent: Nov. 19, 2024

(54) TRANSMISSION ASSEMBLY AND LIFTING COLUMN

(71) Applicant: NINGBO HEALTHKEY MOTION TECHNOLOGY CO., LTD, Zhejiang (CN)

(72) Inventors: Weiqiang Li, Zhejiang (CN); Bing Li, Zhejiang (CN)

(73) Assignee: NINGBO HEALTHKEY MOTION TECHNOLOGY CO., LTD, Zhejiang (CN)

( * ) Notice: Subject to any disclaimer, the term of this patent is extended or adjusted under 35 U.S.C. 154(b) by 752 days.

(21) Appl. No.: 17/625,101

(22) PCT Filed: Dec. 30, 2019

(86) PCT No.: PCT/CN2019/129814

§ 371 (c)(1),
(2) Date: Jan. 6, 2022

(87) PCT Pub. No.: WO2020/135858

PCT Pub. Date: Jul. 2, 2020

(65) Prior Publication Data

US 2022/0274814 A1 Sep. 1, 2022

(30) Foreign Application Priority Data

Dec. 29, 2018 (CN) ........................ 201811632729.5

(51) Int. Cl.
*B66F 3/00* (2006.01)
*B66F 3/10* (2006.01)
(Continued)

(52) U.S. Cl.
CPC .................. *B66F 3/10* (2013.01); *B66F 3/44* (2013.01); *F16H 25/20* (2013.01);
(Continued)

(58) Field of Classification Search
CPC ...... B66F 3/00; B66F 3/44; B66F 3/10; F16H 3/06
See application file for complete search history.

(56) References Cited

U.S. PATENT DOCUMENTS 8,601,889 B2 * 12/2013 Lessing .................. F16H 25/20 74/89.37
9,480,333 B2 * 11/2016 Randløv ............ F16H 25/2056
(Continued)

FOREIGN PATENT DOCUMENTS

CN 106641148 5/2017
CN 206571923 10/2017
(Continued)

OTHER PUBLICATIONS

"International Search Report (Form PCT/ISA/210) of PCT/CN2019/129814," mailed on Mar. 26, 2020, with English translation thereof, pp. 1-5.

(Continued)

*Primary Examiner* — Lee D Wilson
(74) *Attorney, Agent, or Firm* — JCIP GLOBAL INC.

(57) ABSTRACT

A transmission assembly and a lifting column are provided. The transmission assembly includes a first screw rod, a second screw rod, a first transmission sleeve sleeved over the first screw rod, and an actuating device for driving the first transmission sleeve to rotate. An end of the first screw rod proximal to the actuating device is fixed, and an end of the second screw rod distant from the actuating device is fixed. A second transmission sleeve is disposed between the first screw rod and the second screw rod, the second transmission sleeve and the first transmission sleeve are synchronously rotatable and are axially extensible and retractable relative to each other, and both ends of the second transmission sleeve are in threaded transmission connection with the first screw rod and the second screw rod, respectively.

9 Claims, 8 Drawing Sheets

4
A
3
1
51
5
53
52
21
2
4
3
1
61
51
B
62
6
5
C
7
52
63
2
631

(51) Int. Cl.
*B66F 3/44* (2006.01)
*F16H 25/20* (2006.01)

(52) U.S. Cl.
CPC ................ *F16H 2025/2059* (2013.01); *F16H 2025/2084* (2013.01); *F16H 2025/209* (2013.01)

(56) References Cited

U.S. PATENT DOCUMENTS

| | | | | |
|---|---|---|---|---|
| 10,094,456 | B2 * | 10/2018 | Hu | F16H 25/20 |
| 11,454,306 | B2 * | 9/2022 | Hu | F16H 25/2056 |
| 11,691,857 | B2 * | 7/2023 | Peacemaker | B60S 9/08 254/424 |
| 2003/0183027 | A1 * | 10/2003 | Koch | F16H 25/20 74/89.35 |
| 2015/0330486 | A1 * | 11/2015 | Hu | F16H 25/12 74/89.14 |
| 2016/0047446 | A1 * | 2/2016 | Hung | A47B 9/04 74/89.35 |
| 2022/0274814 | A1 * | 9/2022 | Li | F16H 25/20 |

FOREIGN PATENT DOCUMENTS

| | | |
|---|---|---|
| CN | 107420506 | 12/2017 |
| CN | 207659000 | 7/2018 |
| CN | 109678089 | 4/2019 |
| CN | 209618819 | 11/2019 |
| GB | 2000844 | 1/1979 |
| WO | 2008102335 | 4/2009 |

OTHER PUBLICATIONS

“Office Action of China Counterpart Application”, issued on Nov. 28, 2023, p. 1-p. 8.

Lv Jingquan et al., “Cross-Slide Adjustment and Testing”, The Assemblage and Debugging of NC Machine Tool, Jul. 2011,with English translation thereof, pp. 1-12.

Zhao Xuetianet et al., “Sliding Bearings”, Self-Study Introduction to Mechanical Design, Dec. 1993, with English translation thereof, pp. 1-14.

“Office Action of China Counterpart Application”, issued on Sep. 26, 2023, p. 1-p. 6.

“Search Report of Europe Counterpart Application”, issued on Jan. 4, 2022, p. 1-p. 8.

“Communication under Rule 71(3) EPC of Europe Counterpart Application”, issued on Aug. 29, 2022, p. 1-p. 7.

* cited by examiner

TRANSMISSION ASSEMBLY AND LIFTING COLUMN

CROSS-REFERENCE TO RELATED APPLICATION

This application is a 371 of international application of PCT application serial no. PCT/CN2019/129814 filed on Dec. 30, 2019, which claims the priority benefit of China application no. 201811632729.5, filed on Dec. 19, 2018. The entirety of each of the above mentioned patent applications is hereby incorporated by reference herein and made a part of this specification.

TECHNICAL FIELD

The present disclosure relates to lifting columns, and more particularly relate to a transmission assembly and a lifting column.

DESCRIPTION OF RELATED ART

Lifting columns are widely applied in daily life due to their properties of height adjustability and moving convenience. A transmission assembly in conventional lifting columns generally adopts a three-stage transmission, which includes a guiding tube, a larger screw rod, and a smaller screw rod. The larger screw rod lies between the guiding tube and the smaller screw rod. The guiding tube is fitted with an outer spline of the larger screw rod, and the guiding tube and the larger screw rod are axially extensible and retractable relative to each other. The larger screw rod is hollow and provided with an inner spline, the smaller screw rod is fitted with the inner spline of the larger screw rod, and the smaller screw rod and the larger screw rod are axially extensible and retractable relative to each other, and the larger screw rod is fitted with the guiding tube and the smaller screw rod via the outer spline and the inner spline, respectively. The manufacture precision of the larger screw rod is required to be high and the manufacturing procedure is complicated, and at the same time, the conventional transmission assembly is highly demanding on assembling process and are thus complex to assembly.

SUMMARY

Embodiments of the present disclosure provide a transmission assembly that is easy to manufacture, and a lifting column.

In an aspect of the present disclosure, there is provided a transmission assembly. The transmission includes a first screw rod, a second screw rod, a first transmission sleeve fitted over the first screw rod, and an actuating device for driving the first transmission sleeve to rotate. An end of the first screw rod proximal to the actuating device is fixed, and an end of the second screw rod distant from the actuating device is fixed. A second transmission sleeve is disposed between the first screw rod and the second screw rod, the second transmission sleeve and the first transmission sleeve are synchronously rotatable and are axially extensible and retractable relative to each other, and both ends of the second transmission sleeve are in threaded transmission connection with the first screw rod and the second screw rod, respectively.

In an embodiment, the first screw rod is hollow to form a retractable cavity for the second screw rod to extend into; or, the second screw rod is hollow to form a retractable cavity for the first screw rod to extend thereinto.

In an embodiment, a first nut and a second nut are respectively provided at both ends of the second transmission sleeve. The second transmission sleeve is in threaded transmission connection with the first screw rod via the first nut, and the second transmission sleeve is in threaded transmission connection with the second screw rod via the second nut.

In an embodiment, the first screw rod is securely fixed on the actuating device, an end portion of the first screw rod proximal to the actuating device is provided with a threaded hole, and the first screw rod and the actuating device are connected via a bolt.

In an embodiment, the actuating device comprises an electric motor and a transmission component transmission-fitted with a motor shaft. The transmission component comprises a transmission member, a spline is provided on the transmission member, the first transmission sleeve and the spline are transmission-fitted and are rotatable synchronously.

In another aspect of the present disclosure, there is provided a lifting column. The lifting column includes a transmission tube and a transmission assembly disposed in the transmission tube. The transmission assembly refers to the transmission assembly described in any of the above technical solutions.

In an embodiment, the transmission tube includes an inner tube and an outer tube. The inner tube is fixed on an actuating device, and a second screw rod is fixed on a base plate of the outer tube.

In an embodiment, the transmission tube further includes an intermediate tube. A second transmission sleeve and the second screw rod are connected via a second nut, and a locking structure for limiting axial relative positions of the second nut and the intermediate tube is provided external to the second nut.

In an embodiment, the locking structure comprises a first locking block and a second locking block, the first locking block and the second locking block are engaged to form an accommodation slot, and the second nut is disposed in the accommodation slot.

Through the above technical solutions, the present disclosure offers the following advantages.

1. As the first screw rod and the second screw rod are fixedly arranged, when the actuating device brings the first transmission sleeve to rotate, the first transmission sleeve and the second transmission sleeve are rotated synchronously. The second transmission sleeve and the first screw rod are threadedly transmission-fitted. Because the first screw rod is fixed, the second transmission sleeve ascends and descends axially along the first screw rod, realizing extension and retraction between the first transmission sleeve and the second transmission sleeve. The second transmission sleeve and the second screw rod are fitted via threaded transmission, because the second screw rod is fixed, the second transmission sleeve ascends and descends axially along the second screw rod, realizing extension and retraction between the second transmission sleeve and the second screw rod. No inner splines are needed for the first screw rod and the second screw rod, and since the two screw rods are not required to rotate, bearings become unnecessary, such that the transmission assembly has a simpler structure, more convenient for manufacturing and assembling.

2. With the retractable cavity provided, when the transmission assembly is in a retracted state, the two screw rods overlap, such that the minimum length of the transmission assembly is reduced as much as possible and the extensible and retractable distance of the transmission assembly are increased.

3. With the first nut and the second nut, the second transmission sleeve may be in threaded transmission connection with the first screw rod and the second screw rod.

4. A threaded hole is provided at the end portion of the first screw rod proximal to the actuating device, and the first screw rod and the actuating device are connected via a bolt. As such, it is easier to fix the first screw rod. Furthermore, owing to self-lock property of threads, the first screw rod is fixed more reliably, less likely to be loosened.

5. The actuating device comprises an electric motor and a transmission component. The electric motor brings the transmission component to transmit, and the spline in the transmission component moves the first transmission sleeve to rotate synchronously, such that when the actuating device operates, the first transmission sleeve may rotate.

6. The present disclosure further discloses a lifting column, which comprises a transmission tube, and a transmission assembly disposed in the transmission tube. The transmission assembly refers to the transmission assembly described in above any of the technical solutions. Because the transmission assembly has a simpler structure and is more convenient to assemble, the lifting column is also more convenient to assemble.

7. By fixing the inner tube on the actuating device, the position of the inner tube becomes fixed. As the second screw rod is fixed on the base plate of the outer tube, the circumferential position of the second screw rod is fixed and not rotatable. Besides, the end portion of the second screw rod is axially fixed on the base plate, such that when the second screw rod and the second transmission sleeve are telescopically extended or retracted relative to each other, the second screw rod may move the outer tube, thereby realizing extension and retraction between the outer tube and the intermediate tube.

8. With the locking structure provided, positions of the second nut and the intermediate tube are fixed in the axial direction. As such, when the second nut is ascending or descending along the second screw rod, the intermediate tube may be moved by the second nut, thereby realizing telescopic extension and retraction between the intermediate tube and the inner tube.

BRIEF DESCRIPTION OF THE DRAWINGS

Hereinafter, the present disclosure will be further illustrated with reference to the accompanying drawings.

DESCRIPTION OF THE EMBODIMENTS

Hereinafter, the present disclosure will be described in further detail through preferred embodiments with reference to the accompanying drawings. It needs to be understood that the oriental or positional relationships indicated by the terms “upper,” “lower,” “left,” “right,” “longitudinal,” “transverse,” “inner,” “outer,” “vertical,” “horizontal,” “top,” “bottom,” etc. are oriental and positional relationships only based on the drawings, which are intended only for facilitating or simplifying description of the present disclosure, not for indicating or implying that the devices/elements have to possess those specific orientations or have to be configured and operated with those specific orientations; therefore, they should not be understood as limitations to the present disclosure.

Figure 1:
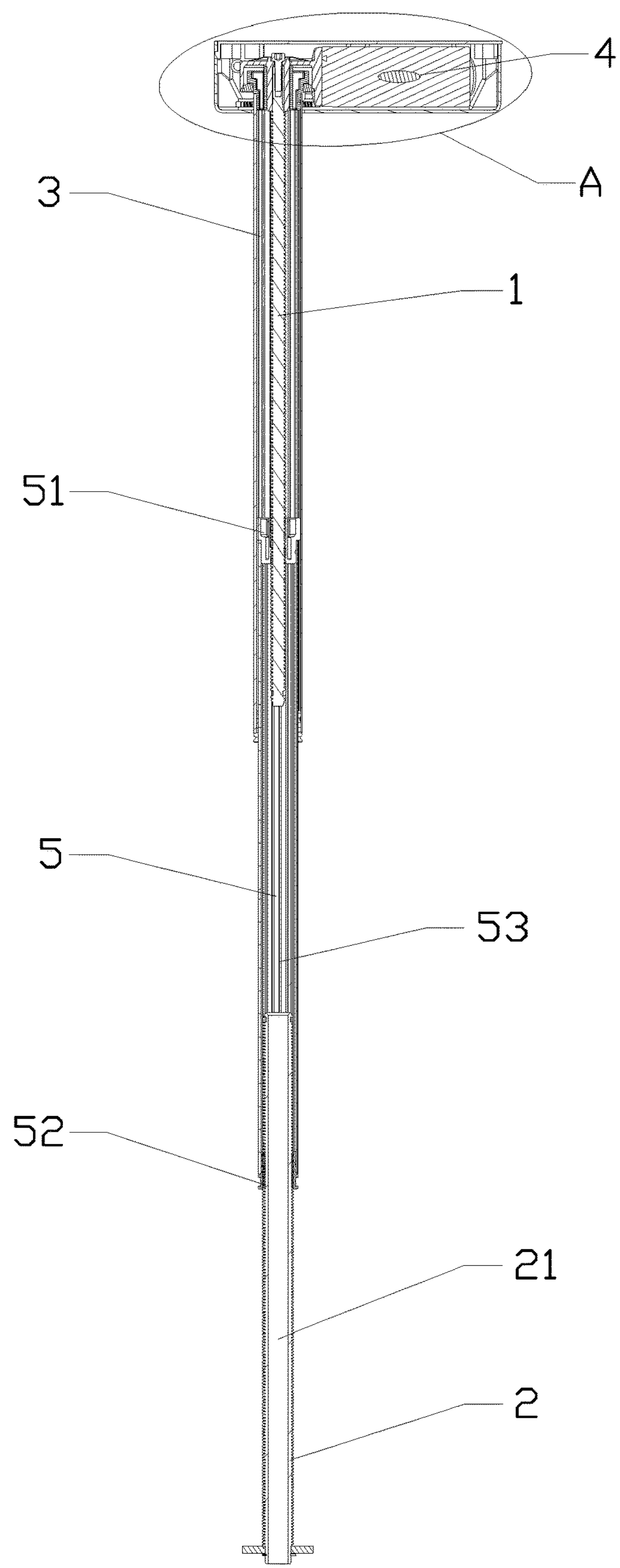
FIG. 1 is a sectional view of a transmission assembly according to the present disclosure.
Figure 2:
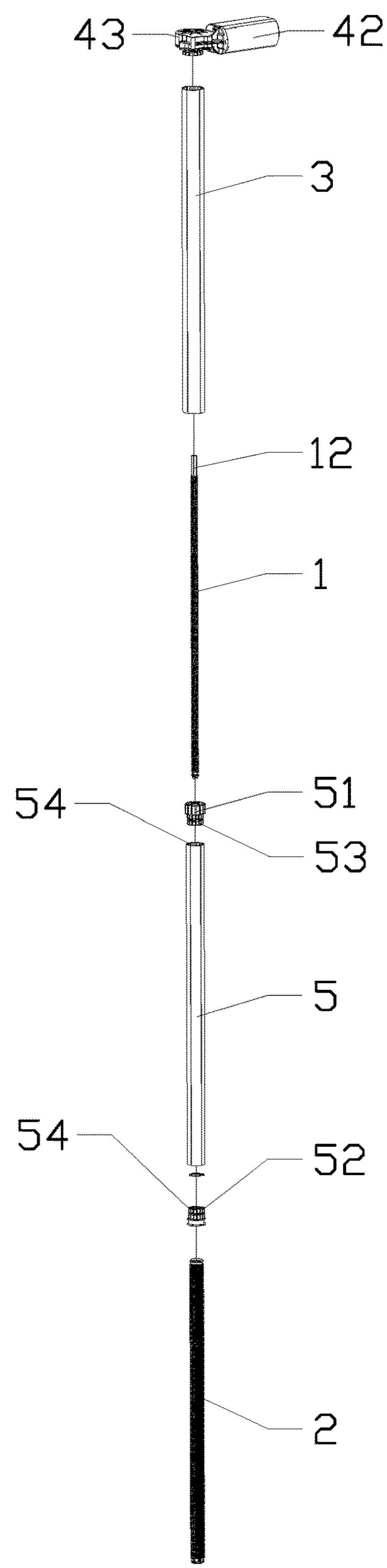
FIG. 2 is an exploded view of the transmission assembly according to the present disclosure.
Figure 3:
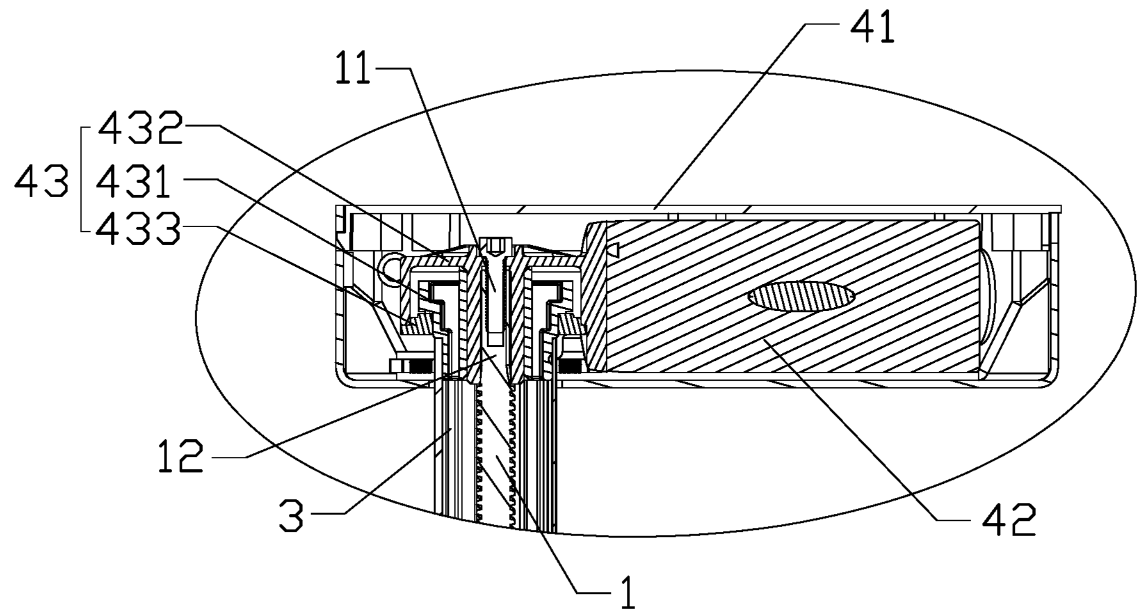
FIG. 3 is an enlarged view of region A in FIG. 1.
Figure 4:
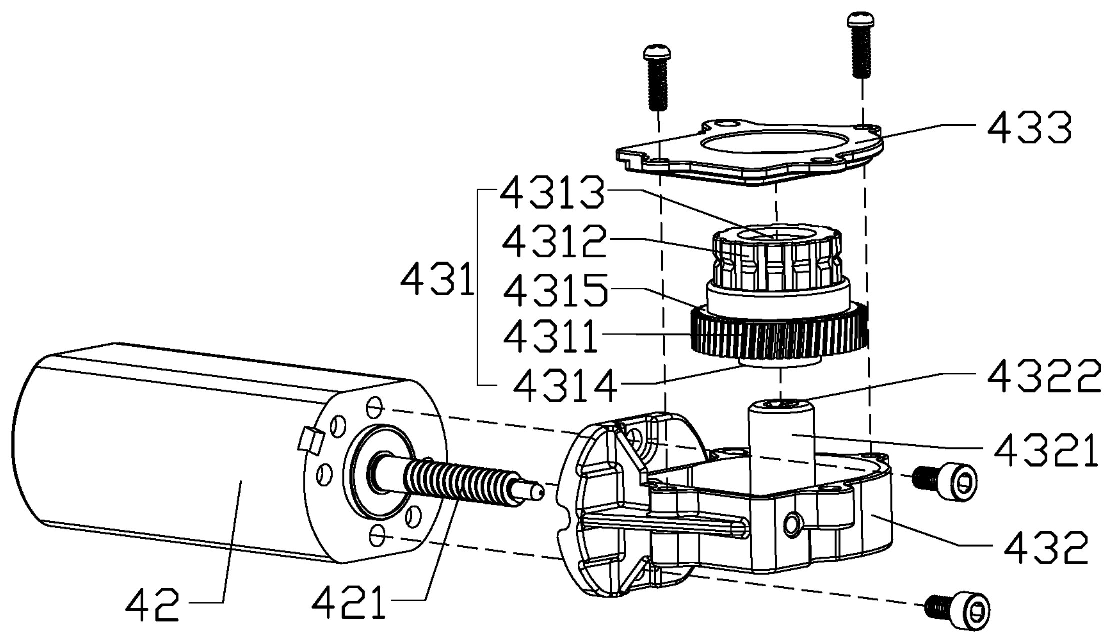
FIG. 4 is an exploded view of an actuating device in the transmission assembly of the present disclosure.

As illustrated in FIG. 1 to FIG. 4, a transmission assembly is provided includes a first screw rod 1, a second screw rod 2, a first transmission sleeve 3 sleeved over the first screw rod 1, and an actuating device 4 for driving the first transmission sleeve 3 to rotate. An end of the first screw rod proximal to the actuating device 4 is fixed, and an end of the second screw rod 2 distant from the actuating device 4 is fixed. A second transmission sleeve 5 is disposed between the first screw rod 1 and the second screw rod 2, the second transmission sleeve 5 and the first transmission sleeve 3 are synchronously rotatable and are axially extensible and retractable relative to each other, and both ends of the second transmission sleeve 5 are in threaded transmission connection with the first screw rod 1 and the second screw rod 2, respectively. During operating, the actuating device 4 brings the first transmission sleeve 3 to rotate, the second transmission sleeve 5 rotates synchronously with the first transmission sleeve 3, and the second transmission sleeve 5 and the first screw rod 1 are threadedly transmission-fitted. Because the first screw rod 1 is fixed, the second transmission sleeve 5 ascends and descends axially along the first screw rod 1, thereby realizing telescopic extension and retraction between the second transmission sleeve 5 and the first transmission sleeve 3. The second transmission sleeve 5 and the second screw rod 2 are fitted via threaded transmission, and because the second screw rod 2 is fixed, the second transmission sleeve 5 ascends and descends axially along the second screw rod 2, thereby realizing telescopic extension and retraction between the second transmission sleeve 5 and the second screw rod 2. Because no inner splines are provided for the first screw rod 1 and the second screw rod 2, and the two screw rods do not rotate, bearings become unnecessary, such that the transmission assembly has a simpler structure, more convenient for manufacturing and assembling.

In this embodiment, the second screw rod 2 is hollow to form an retractable cavity 21 for the first screw rod 1 to extend into, such that when the transmission assembly is in a retracted state, the two screw rods overlap, which reduces the minimum length of the transmission assembly as much as possible and increases the extensible and retractable distance of the transmission assembly.

In an embodiment, a first nut 51 and a second nut 52 are respectively provided at both ends of the second transmission sleeve 5. The second transmission sleeve 5 is in threaded transmission connection with the first screw rod 1 via the first nut 51, and the second transmission sleeve 5 is in threaded transmission connection with the second screw rod 2 via the second nut 52.

A limiting rib 53 is provided in the second transmission sleeve 5, and a limiting recess 54 fitted with the limiting rib 53 is provided on the first nut 51 and the second nut 52, respectively. The limiting rib 53 and the limiting recess 54 are fitted to limit circumferential positions of the first nut 51 and the second nut 52, such that the first nut 51 and the second nut 52 maintain synchronous rotation with the second transmission sleeve 5, and no mutual rotation between the first nut 51 and the second nut 52 will occur. The first nut 51 and the second nut 52 are axially limited via a snap spring, such that the first nut 51 and the second nut 52 maintain synchronous axial movement with the second transmission sleeve 5, and no relative movement between the first nut 51 and the second nut 52 will occur. In this way, it is guaranteed that the first nut 51 and the second nut 52 are stably and reliably fitted with the second transmission sleeve 5. Besides, such arrangements also facilitate manufacture and assembly.

The actuating device 4 comprises a casing 41, an electric motor 42 and a transmission component 43 which are disposed in the casing 41. The transmission component 43 comprises a transmission member 431 and a fixed base 432. A central shaft 4321 is provided on the fixed base 432. A mounting hole 4313 fitted with the central shaft 4321, a worm gear 4311 transmission-fitted with the motor shaft 421, and a spline 4312 fitted with and synchronously rotated with the first transmission sleeve 3 are provided on the transmission member 431. The transmission member 431 is rotatably mounted on the fixed base 432 via fitting between the central shaft 4321 and the mounting hole 4313. The axial position of the transmission member 431 is fixed, such that the transmission member 431 rotates stably without generating axial movement. Specifically, upon operating of the electric motor 42, the motor shaft 421 brings the worm gear 4311 to rotate, such that the transmission member 431 rotates about the fixed base 432, and the spline 4312 on the transmission member 431 rotates to drive the first transmission sleeve 3 to rotate, thus the first transmission sleeve can be rotated without installing a bearing. Hence, the transmission assembly is simpler in structure, with reduced manufacture cost and assembly space.

A cover plate 433 is provided on the fixed base 432, and an upper limiting step 4314 and a lower limiting step 4315 are provided on the transmission member 431. The upper limiting step 4314 and the fixed base 432 are fitted to prevent movement of the transmission member 431 towards the fixed base 432. The lower limiting step 4315 and the cover plate 433 are fitted to prevent movement of the transmission member 431 towards the cover plate 433. In this way, axial position of the transmission member is limited. Hence, axial movement of the transmission member will not occur, and the transmission is more stable.

The first screw rod 1 is fixed on the actuating device 4. A threaded hole is provided at an end portion of the first screw rod 1 proximal to the actuating device 4, and the first screw rod 1 and the actuating device 4 are connected via a bolt 11. As such, it is easier to fix the first screw rod. Furthermore, owing to self-lock property of threads, the first screw rod is fixed more reliably, less likely to be loosened.

Specifically, an end of the first screw rod 1 proximal to the actuating device 4 is provided with a connection segment 12, and the diameter of the connection segment 12 is smaller than the diameter of the first screw rod 1. The threaded hole is disposed at an end portion of the connection segment 12. A mounting cavity 4322 is provided on the fixed base 432, such that the connection segment 12 may extend into the mounting cavity 4322, but the first screw rod 1 cannot extend therein. The mounting cavity 4322 is provided with a through hole. The end portion of the connection segment 12 is fixed inside the mounting cavity 4322 via the bolt 11. The transition step 13 is disposed between the first screw rod 1 and the connection segment 12, and through fitting between the transition step 13 and the bolt 11, the fixation of the first screw rod is realized, such that the fixation of the first screw rod is simple.

Figure 5:
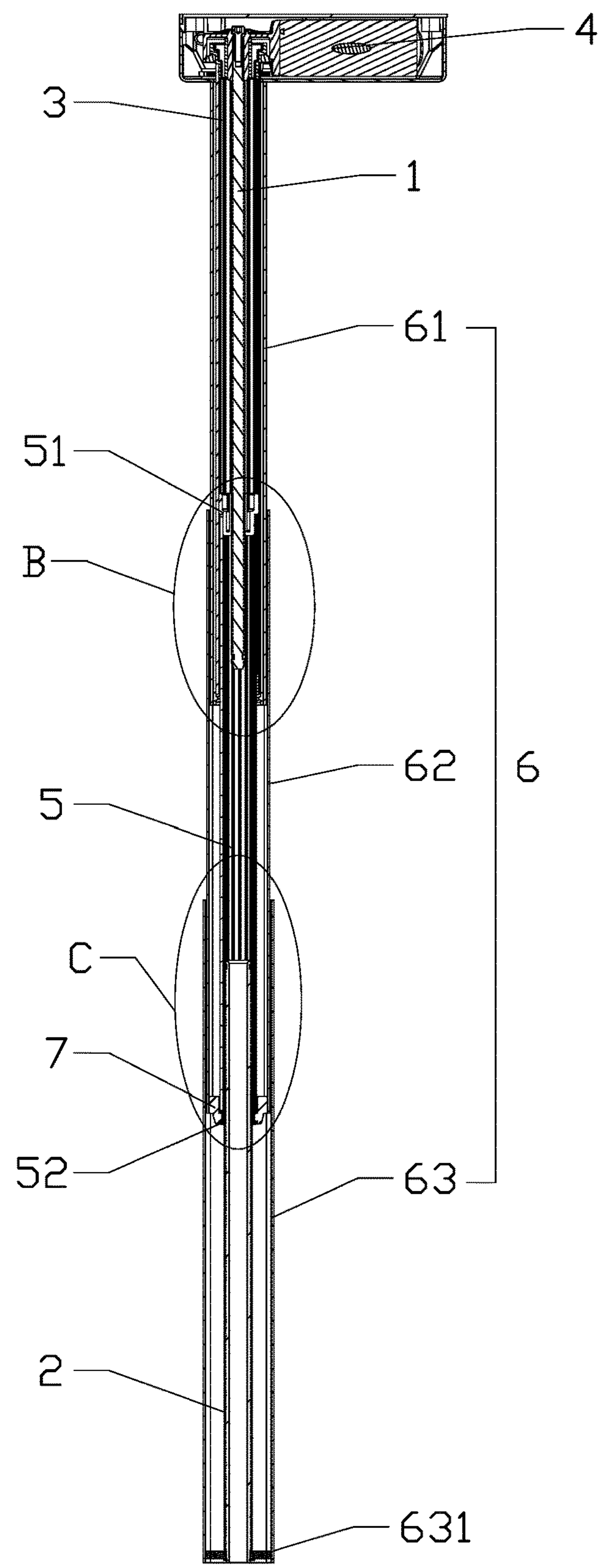
FIG. 5 is a sectional view of a lifting column according to the present disclosure.
Figure 6:
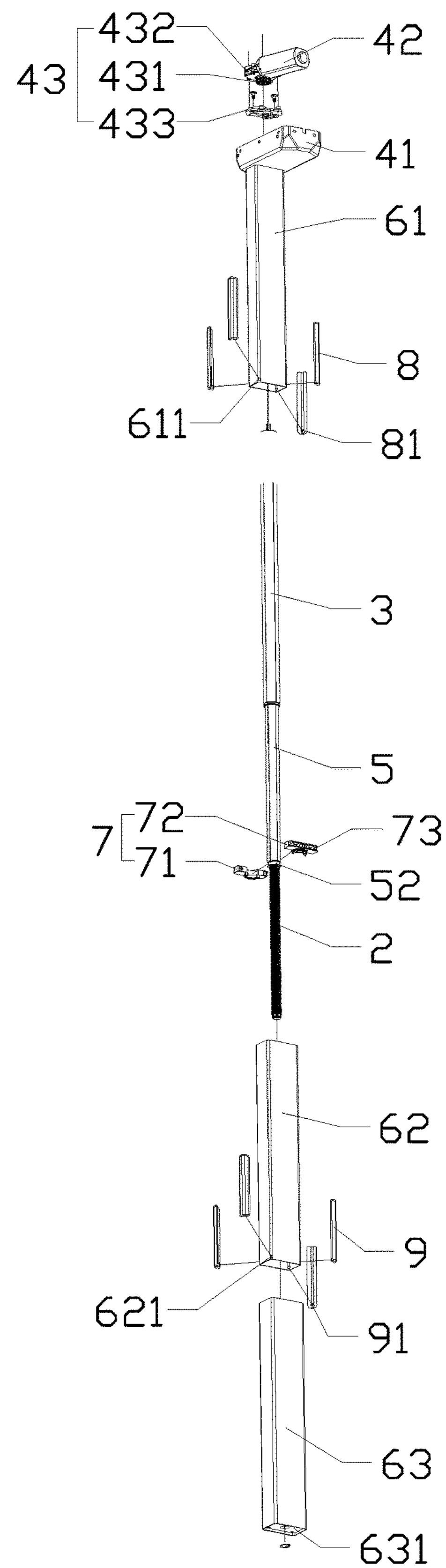
FIG. 6 is an exploded view of the lifting column according to the present disclosure.
Figure 7:
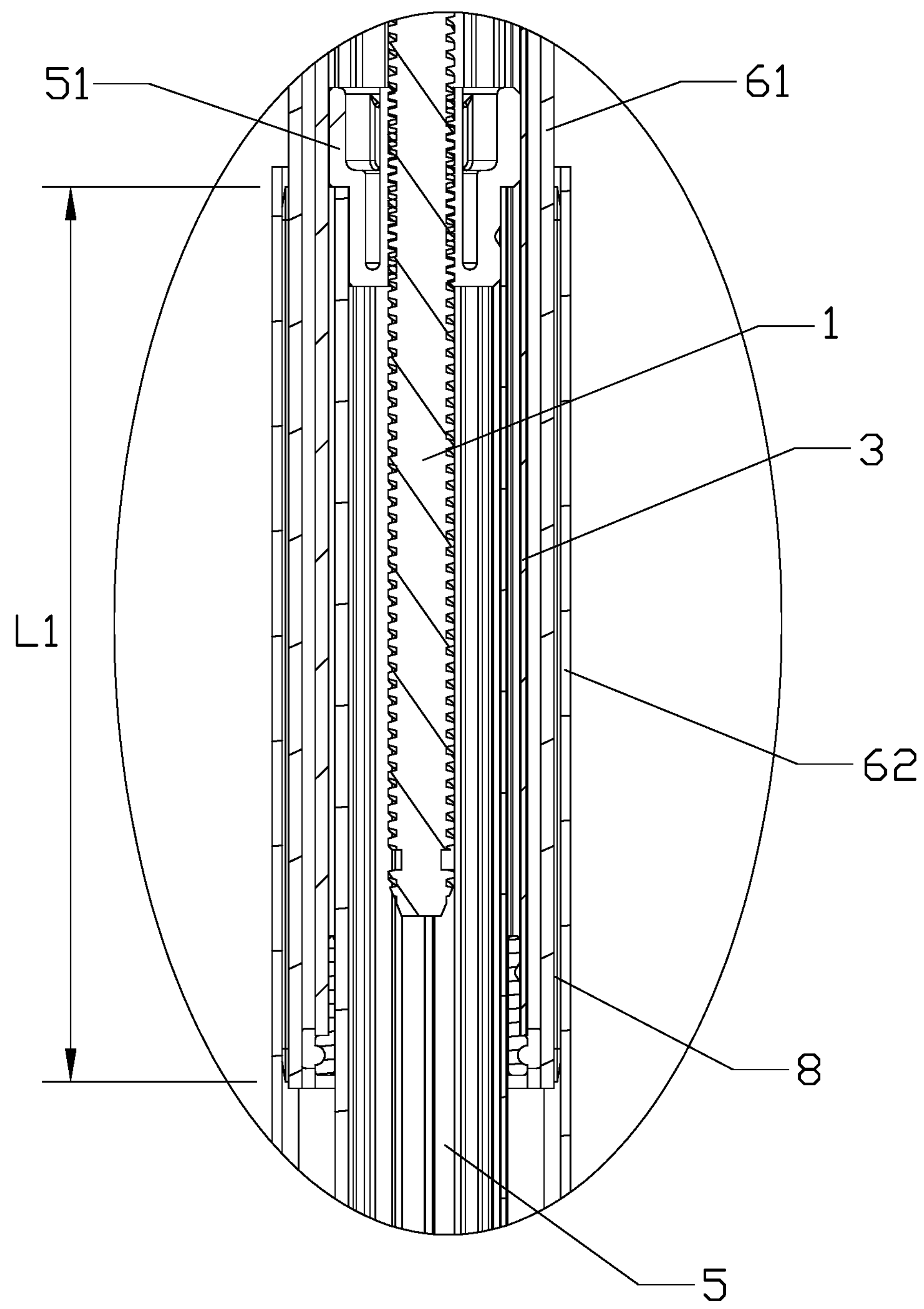
FIG. 7 is an enlarged view of region B in FIG. 5.
Figure 8:
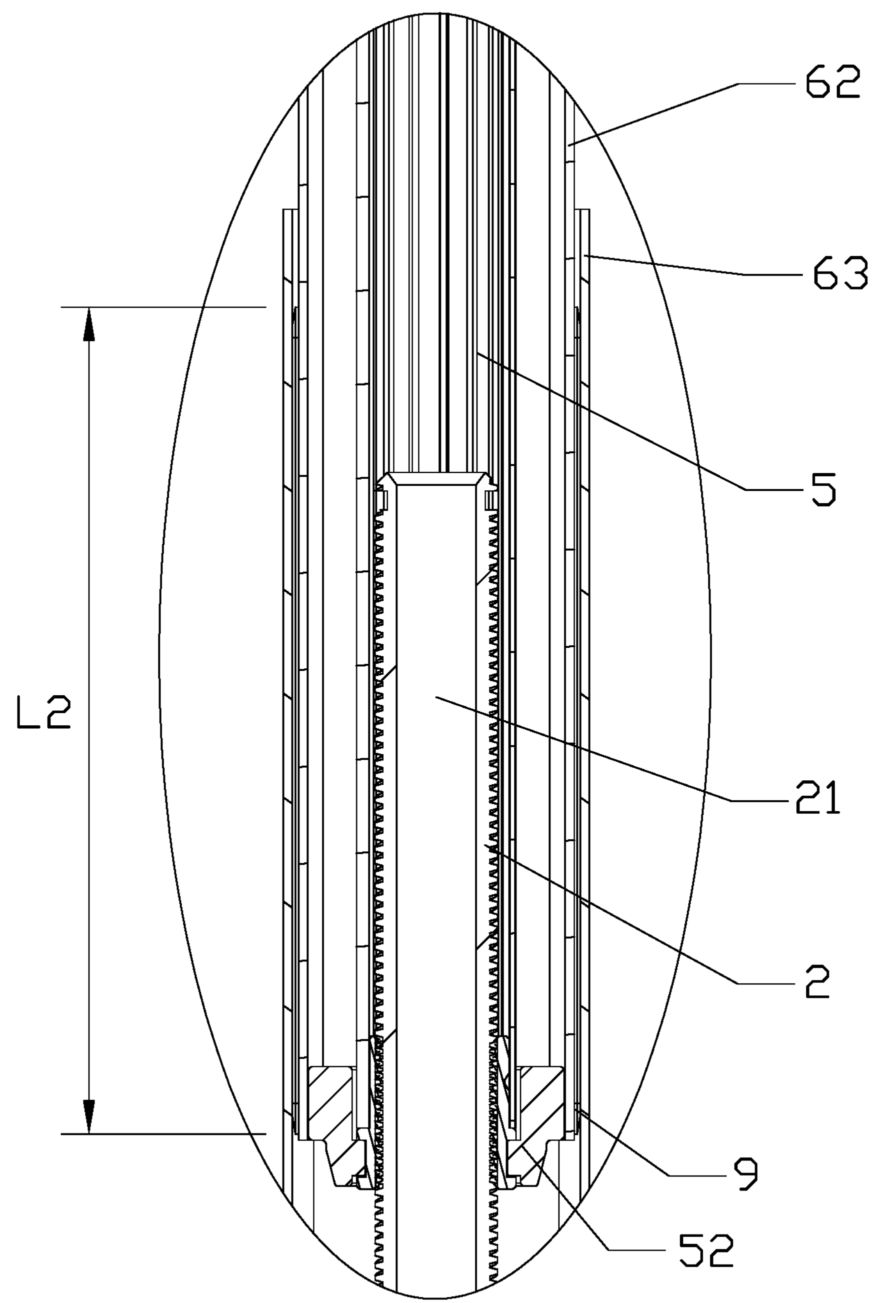
FIG. 8 is an enlarged view of region C in FIG. 5.
Figure 9:
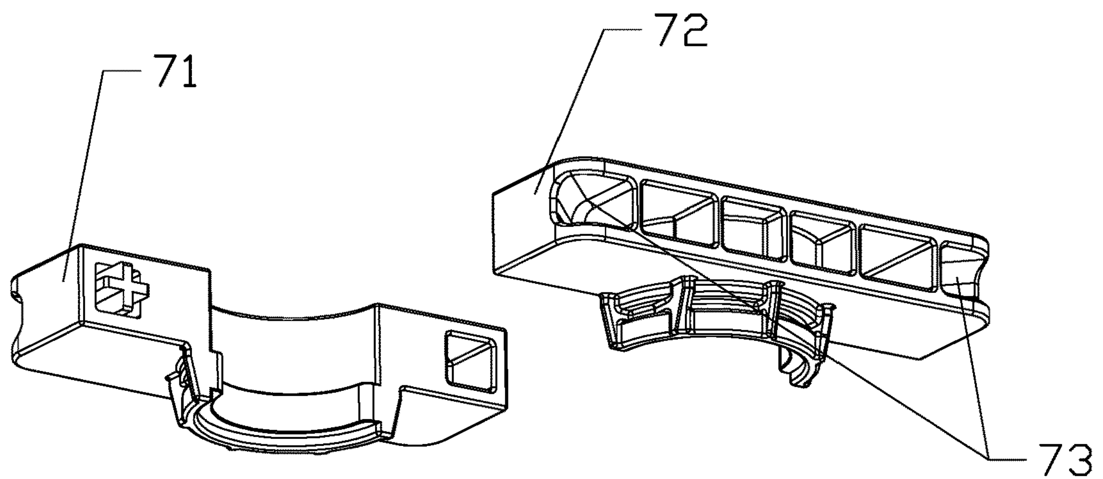
FIG. 9 is a structural schematic diagram of a locking structure in the lifting column according to the present disclosure.
Figure 10:
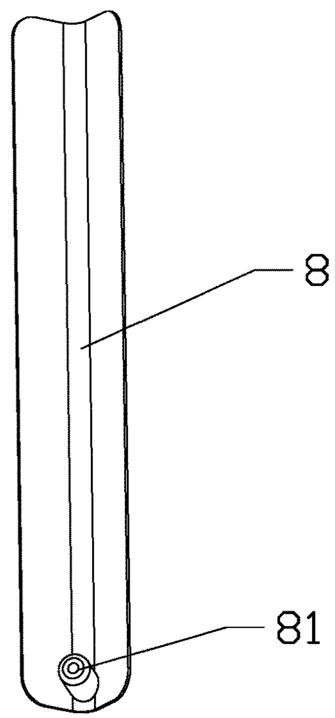
FIG. 10 is a structural schematic view of a first stationary sliding block in the lifting column according to the present disclosure.

As illustrated in FIG. 5 to FIG. 10, a lifting column is further provided. The lifting column includes a transmission tube 6 and a transmission assembly disposed in the transmission tube 6. The transmission assembly refers to the transmission assembly described in any of the above technical solutions. Because the transmission assembly has a simpler structure and is more convenient to assemble, the lifting column is also more convenient to assemble. The lifting column may be installed in a top-to-down manner, or in a down-to-top manner. In this embodiment, the lifting column is installed in a top-to-down manner, i.e., the actuating device 4 is disposed above the transmission tube 6.

The transmission tube 6 comprises an inner tube 61 and an outer tube 63. The inner tube 61 is fixed on the actuating device 4, and the second screw rod 2 is fixed on a base plate 631 of the outer tube 63, such that the circumferential position of the second screw rod is fixed and is not able to rotate. Meanwhile, the end portion of the second screw rod 2 is axially fixed on the base plate 631, such that when the second screw rod 2 and the second transmission sleeve 5 are telescopically move relative to each other, the second screw rod 2 may move the outer tube 63, realizing telescopic extension and retraction between the outer tube 63 and the intermediate tube 62.

The transmission tube 6 further comprises an intermediate tube 62. A locking structure 7 is provided outside the second nut 52. With the locking structure 7, axial relative positions of the second nut 52 and the intermediate tube 62 are limited, such that when the second nut 52 is ascending or descending along the second screw rod 2, the intermediate tube 62 may be moved by the second nut 52, thereby realizing extension and retraction between the intermediate tube 62 and the inner tube 61.

When the transmission assembly is extended or retracted, the second nut drives the intermediate tube to move, realizing extension or retraction between the intermediate tube and the inner tube as well as the extension or retraction between the second screw rod and the second transmission tube. The second screw rod drives the outer tube to move via the base plate, realizing extension or retraction between the intermediate tube and the outer tube, and further implementing lifting of the lifting column.

A first stationary sliding block 8 is provided between the intermediate tube 62 and the inner tube 61, and a second stationary sliding block 9 is provided between the intermediate tube 62 and the outer tube 63. A first positioning column 81 is provided on the first stationary sliding block 8, and a second positioning column 92 is provided on the second stationary sliding block 9. A first positioning hole 611 is provided in the inner tube 61. The first positioning hole 611 and the first positioning column 81 are fitted to limit axial position of the first stationary sliding block 8. A second positioning hole 621 is provided in the intermediate tube 62. The second positioning hole 621 and the second positioning column 92 are fitted to limit axial position of the second stationary sliding block 9. The first stationary sliding block 8 is provided in plurality, and the plurality of first stationary sliding blocks 8 are arranged at intervals along the circumferential position of the inner tube 61, so as to guarantee a relatively smooth displacement between the inner tube 61 and the intermediate tube 62. The second stationary sliding block 9 is provided in plurality, and the plurality of second stationary sliding blocks 9 are arranged at intervals along the circumferential direction of the intermediate tube 62, so as to guarantee a relatively smooth displacement between the intermediate tube 62 and the outer tube 63. The first stationary sliding block 8 has a length L1, where 30 mm≤L1≤200 mm. The contact length of the first stationary sliding block with the intermediate tube and the inner tube is relatively long, such that it is unnecessary to arrange two groups (upper and lower) of first stationary sliding blocks between the intermediate tube and the inner tube, and one group suffices to ensure smooth displacement between the inner tube and the intermediate tube, which simplifies manufacturing of the lifting column, and meanwhile reduces burrs on the inner tube, thereby avoiding burr-caused retraction of the lifting column during the lifting process, and offering a more reliable lifting. The second stationary sliding block 9 has a length L2, where 30 mm≤L2≤200 mm. For the same reason, due to elimination of the hole in the intermediate tube, manufacturing of the lifting column is facilitated. Meanwhile, burrs on the intermediate tube are reduced as much as possible, such that lifting reliability of the lifting column is enhanced. In this embodiment, L1 and L2 are both 100 mm, which guarantees relatively stability of the lifting process of the lifting column. Besides, the appropriate lengths do not affect the extension or retraction amount of the lifting column.

The lifting column is a square lifting column, such that the vertical projections of the first stationary sliding block 8 and the second stationary sliding block 9 are all of a "┐" shape. The first stationary sliding block 8 is disposed at a corner of the inner tube 61, and the second stationary sliding block 9 is disposed at a corner of the intermediate tube 62, such that each stationary sliding block may be fitted with two surfaces, further enhancing stability of the displacement between the inner tube and the intermediate tube as well as the displacement between the inner tube and the outer tube, and rendering a more reliable lifting. In this embodiment, four first stationary sliding blocks and four second stationary sliding blocks are provided. The four first stationary sliding blocks are respectively disposed at four corners of the inner tube, and the four second stationary sliding blocks are respectively disposed at four corners of the intermediate tube.

A side of the first stationary sliding block 8 proximal to the intermediate tube 62 is a smooth surface, and a side of the second stationary sliding block 9 proximal to the outer tube 63 is a smooth surface. As such, friction between the inner tube and the intermediate tube as well as friction between the intermediate tube and the outer tube is reduced, thereby rendering a smoother lifting.

A connection hole 73 is provided on a sidewall of the locking structure 7. The second positioning column 92 runs through the second positioning hole 621 to fit with the connection hole 73, which limits the axial relative position between the locking structure 7 and the intermediate tube 62, eliminating a need of additionally providing a connection structure, rendering the structure of the lifting column simpler and more compact.

In an embodiment, the locking structure 7 comprises a first locking block 71 and a second locking block 72. The first locking block 71 and the second locking block 72 form an accommodation slot when being engaged with each other, and the second nut 52 is disposed in the accommodation slot. Engagement between the first locking block 71 and the second locking block 72 facilitates assembly of the locking structure.

It is understood that the hollow of the first screw rod forms a retractable cavity for the second screw rod to extend into.

It is understood that a limiting recess may be provided in the second transmission sleeve, wherein a limiting rib fitted with the limiting recess to implement circumferential limit is provided on the first nut and the second nut, respectively.

It is understood that the first nut may be fixed on the second transmission sleeve by snap-fitting or welding or other manners.

It is understood that the second nut may be fixed on the second transmission sleeve by snap-fitting or welding or other manners.

It is understood that the first screw rod may be fixed on the actuating device by snap-fitting or other manners.

It is understood that the lifting column may be installed in a down-to-top manner, i.e., the actuating device is disposed below the transmission tube.

It is understood that the length L1 of the first stationary sliding block may be 30 mm, 40 mm, 50 mm, 60 mm, 70 mm, 80 mm, 90 mm, 110 mm, 120 mm, 130 mm, 140 mm, 150 mm, 160 mm, 170 mm, 180 mm, 190 mm, 200 mm, and etc.

It is understood that the length L2 of the second stationary sliding block may be 30 mm, 40 mm, 50 mm, 60 mm, 70 mm, 80 mm, 90 mm, 110 mm, 120 mm, 130 mm, 140 mm, 150 mm, 160 mm, 170 mm, 180 mm, 190 mm, 200 mm, and etc.

It is understood that two first stationary sliding blocks may be provided. The two stationary sliding blocks are respectively disposed at 2 diagonal corners of the inner tube.

It is understood that two secondary stationary sliding blocks may be provided. The two stationary sliding blocks are respectively disposed at 2 diagonal corners of the inner tube.

Besides the preferred embodiments above, the present disclosure also has other embodiments. Those skilled in the art may make various variations and alternations based on the present disclosure, and such variations and alterations should fall within the scope defined by the appended claims without departing from the spirit of the present disclosure.

What is claimed is:

1. A transmission assembly, comprising a first screw rod, a second screw rod, a first transmission sleeve sleeved over the first screw rod, and an actuating device for driving the first transmission sleeve to rotate, wherein an end of the first screw rod proximal to the actuating device is fixed and does not rotate, and an end of the second screw rod distant from the actuating device is fixed and does not rotate; a second transmission sleeve is disposed between the first screw rod and the second screw rod, the second transmission sleeve and the first transmission sleeve are synchronously rotatable and are axially extensible and retractable relative to each other, and both ends of the second transmission sleeve are in threaded transmission connection with the first screw rod and the second screw rod, respectively.

2. The transmission assembly according to claim 1, wherein the first screw rod is hollow to form a retractable cavity for the second screw rod to extend into; or, the second screw rod is hollow to form a retractable cavity for the first screw rod to extend into.

3. The transmission assembly according to claim 1, wherein a first nut and a second nut are respectively provided at both ends of the second transmission sleeve, the second transmission sleeve is in threaded transmission connection with the first screw rod via the first nut, and the second transmission sleeve is in threaded transmission connection with the second screw rod via the second nut.

4. The transmission assembly according to claim 1, wherein the first screw rod is securely fixed on the actuating device, an end portion of the first screw rod proximal to the actuating device is provided with a threaded hole, and the first screw rod and the actuating device are connected via a bolt.

5. The transmission assembly according to claim 1, wherein the actuating device comprises an electric motor, and a transmission component transmission-fitted with a motor shaft, wherein the transmission component comprises a transmission member, a spline is provided on the transmission member, the first transmission sleeve and the spline are transmission-fitted and are rotatable synchronously.

6. A lifting column, comprising a transmission tube, and a transmission assembly disposed in the transmission tube, wherein the transmission assembly is the transmission assembly according to claim 3.

7. The lifting column according to claim 6, wherein the transmission tube includes an inner tube and an outer tube, the inner tube is fixed on the actuating device, and the second screw rod is fixed on a base plate of the outer tube.

8. The lifting column according to claim 7, wherein the transmission tube further includes an intermediate tube, the second transmission sleeve and the second screw rod are connected via the second nut, and a locking structure for limiting axial relative positions of the second nut and the intermediate tube is provided external to the second nut.

9. The lifting column according to claim 8, wherein the locking structure comprises a first locking block and a second locking block, the first locking block and the second locking block are engaged to form an accommodation slot, and the second nut is disposed in the accommodation slot.

* * * * *